(12) United States Patent
Hogan et al.

(10) Patent No.: US 12,344,423 B2
(45) Date of Patent: Jul. 1, 2025

(54) MULTI-LAYER PRODUCTS

(71) Applicant: MEDI-Clear Ltd, Hull (GB)

(72) Inventors: Mark Paul Hogan, Hull (GB);
Stephen John Crow, Hull (GB);
Steven Brian Watt, Hull (GB)

(73) Assignee: MEDI-CLEAR LTD, Hull (GB)

( * ) Notice: Subject to any disclaimer, the term of this patent is extended or adjusted under 35 U.S.C. 154(b) by 302 days.

(21) Appl. No.: 18/070,563

(22) Filed: Nov. 29, 2022

(65) Prior Publication Data

US 2023/0091744 A1 Mar. 23, 2023

Related U.S. Application Data

(63) Continuation-in-part of application No. 17/081,046, filed on Oct. 27, 2020, now Pat. No. 11,745,926.

(30) Foreign Application Priority Data

Nov. 26, 2019 (GB) ........................................ 1917193
Dec. 23, 2019 (GB) ........................................ 1919192

(51) Int. Cl.
*B05D 1/02* (2006.01)
*B05C 5/02* (2006.01)
(Continued)

(52) U.S. Cl.
CPC .............. *B65B 7/01* (2013.01); *B05C 5/0245* (2013.01); *B05D 1/02* (2013.01); *B05D 3/12* (2013.01); *B65B 7/162* (2013.01)

(58) Field of Classification Search
CPC ......... B65B 7/01; B65B 7/162; B05C 5/0245; B05D 1/02; B05D 3/12; B32B 2255/12;
(Continued)

(56) References Cited

U.S. PATENT DOCUMENTS 5,310,060 A * 5/1994 Bitner .................. B65D 75/327
206/532
6,691,870 B1 * 2/2004 Palm .................. B65D 73/0092
206/461
(Continued)

FOREIGN PATENT DOCUMENTS

CN CM108211108 A 6/2018
WO 2005023670 A1 3/2005

OTHER PUBLICATIONS

Combined Search and Examination Report for Great Britain Application No. GB1917193.3, published by the United Kingdom Intellectual Property Office, date of report May 26, 2020, 5 pages.
Extended European Search Report for European Patent Application No. 20203057.3, dated Mar. 17, 2021, with annex and related documents (6 pages).

*Primary Examiner* — Cynthia L Schaller
(74) *Attorney, Agent, or Firm* — Kilyk & Bowersox, P.L.L.C.

(57) ABSTRACT

A method of making a multi-layer product or seal is described. An adhesive layer is applied to a surface of a first layer. A patch material is applied to a surface of the adhesive layer, using a coating or spraying process, to define one or more patches. At least the first layer is cut to define preformed lines of separation defining one or more first portions. Each first portion is associated with a respective one of the one or more patches.

16 Claims, 7 Drawing Sheets

(51) Int. Cl.
*B05D 3/12* (2006.01)
*B65B 7/01* (2006.01)
*B65B 7/16* (2006.01)

(58) Field of Classification Search
CPC ...... B32B 2255/205; B32B 2307/4023; B32B 2439/70; B32B 3/085; B32B 3/266; B32B 3/28; B32B 7/06; B32B 15/20; B32B 27/36; B32B 2255/10; B32B 2435/02; B32B 29/00; B32B 2439/80; B32B 7/12; B65D 77/2056; B65D 77/2024; B65D 1/36; B65D 75/327
See application file for complete search history.

(56) References Cited

U.S. PATENT DOCUMENTS

| | | | |
|---|---|---|---|
| 7,984,807 B2 | 7/2011 | Elliott | |
| 2004/0182738 A1 | 9/2004 | Williams-Hartman | |
| 2009/0057440 A1* | 3/2009 | Stein | B65B 47/04 |
| | | | 239/289 |
| 2011/0233097 A1* | 9/2011 | Clark | B65D 75/366 |
| | | | 493/56 |
| 2018/0319533 A1 | 11/2018 | Hogan | |
| 2019/0151197 A1 | 5/2019 | Hogan | |
| 2019/0248558 A1 | 8/2019 | Hogan et al. | |
| 2019/0329933 A1 | 10/2019 | Hogan | |
| 2020/0115074 A1 | 4/2020 | Hogan | |

\* cited by examiner

MULTI-LAYER PRODUCTS

CROSS-REFERENCE TO RELATED APPLICATIONS

This application is a continuation-in-part of U.S. patent application Ser. No. 17/081,046, filed Oct. 27, 2020, which in-turn claims priority to United Kingdom Patent Application No. 1917193.3, filed Nov. 26, 2019, and to United Kingdom Patent Application No. 1919192.3, filed Dec. 23, 2019, each of which is incorporated herein by reference in its entirety.

FIELD OF THE INVENTION

The invention relates to multi-layer products, and in particular to multi-layer products that can be used as a seal for use with a container for storing and dispensing consumer products. The term "consumer products" is intended to cover a wide variety of products as illustrated by the following (non-exhaustive) list: foods, either for immediate consumption, pre-cooked, prepared or oven ready, including prepared meals, confectionary, hardware and DIY items, cosmetics, seeds, animal and fish feeds, electronic components, medical appliances and dressings, medicines and medication such as pills, tablets and capsules.

BACKGROUND

Self-adhesive (or pressure sensitive) labels typically comprise a first layer (often referred to as a face material), an adhesive layer, and a second layer (often referred to as a liner or backing). The adhesive layer is arranged between the first layer and the second layer. Cut lines are provided in the first layer to define the periphery of individual labels. The first layer can include cut lines that define two or more labels. The labels can be arranged in an array on a single sheet or in the form of a roll that can be used with automated label applicator machines, for example. The cut lines can be formed using a die cutter and normally extend all of the way through the first layer and may penetrate part of the way into the adhesive layer, but not into the second layer.

The first and second layers can be formed of any suitable material. A common material is paper but plastics such as polypropylene (PP) and polyethylene terephthalate (PET) are often used to provide improved resistance to tearing. The first layer may itself comprise two or more separate layers—e.g., a cover layer with provides printable surface and a barrier layer to which the adhesive layer is applied.

A release layer or coating is applied to a surface of the second layer to allow the self-adhesive labels to be removed easily and cleanly from the second layer. Once a label is removed from the second layer, the exposed adhesive on its underside allows the label to be adhered to a surface as required.

The release coating can be made of any suitable material, but silicone-based coatings are commonly used.

For some applications, cut lines can also be provided in the second layer to define the periphery of individual liner portions. The second layer can include cut lines that define two or more liner portions. Often, each liner portion will be associated with a corresponding label. The cut lines in the second layer can be formed using a die cutter and normally extend all of the way through the second layer and may penetrate part of the way into the adhesive layer, but not into the first layer.

International Patent Application Publication No. WO 2005/023670 A1 describes a seal for use with a container for storing and dispensing consumer products. The container may be used in place of conventional blister packs for the packaging of pills, tablets and capsules, or may be used for organising and storing mixed medication for subsequent dispensation according to a pre-defined dosage regimen. The principle behind such mixed medication containers is that a dosage regimen of mixed medication can be organised in advance for a period of a week or more, and a patient or nurse can then remove from the container, at predefined times over the said period, the one or more pills, tablets and/or capsules to be administered on each occasion according to the dosage regimen.

The container includes a tray having a generally planar top surface into which has been formed an array of discrete cavities for receiving the consumer products.

The seal is generally similar in construction to the self-adhesive labels described above. In particular, the seal includes a first layer (or cover film) that is adhered to the generally planar top surface of the tray by a layer of adhesive to seal the cavities to retain the consumer products in the cavities. The cover film is often a flexible sheet of plastics material. The cover film has pre-formed lines of separation defining a releasable portion per cavity to retain the consumer products in that cavity until it is removed. The cover film therefore has a corresponding array of releasable portions. Each line of separation can be a tear line (e.g., a score line or perforation line) that must be torn or broken to release the releasable portion, or a cut line extending completely through the material of the cover film. Each releasable portion of the cover film has low vapour transmission properties in the area which in use overlies the associated cavity, those low vapour transmission properties being created by a barrier patch with high vapour barrier properties shaped and sized to overlie the associated cavity. Each barrier patch is adhered to the underside of the cover film by the same layer of adhesive as that which adheres the cover film to the top surface of the tray.

The array of barrier patches is created from a single sheet of barrier film (or second layer) as follows. A single sheet of barrier film is adhered to the underside of the cover film by the adhesive layer for the seal. The barrier film is often a flexible sheet of plastics material. The barrier film has pre-formed lines of separation (e.g., tear lines such as score lines or perforation lines, or cut lines) defining the periphery of each vapour-resistant barrier patch so that peeling away the majority of the barrier film from the cover film immediately prior to application of the cover film to secure it to the generally planar top surface of the tray exposes the adhesive in areas necessary for adhesion to the tray. If the lines of separation are tear lines they will tear when the barrier film is removed to leave a barrier patch attached to the underside of each releasable portion of the cover film.

In a preferred arrangement, the barrier patches are larger than the associated releasable portions of the cover film and are adhered to an overlapping region of the cover film between the pre-formed line of separation in the cover film and the periphery of the associated barrier patch. The barrier patches are not adhered to the generally planar surface of the tray, but only to the cover film.

The cover film is secured to the tray by the same layer of adhesive that is used to secure the cover film to the barrier film. After the majority of the barrier film has been peeled away from the cover film to expose the adhesive, the cover film can be secured to the top surface of the tray. Although not described in WO 2005/023670, the skilled person will understand that a release layer or coating will normally be applied to a surface of the barrier film so that it can be released easily from the adhesive layer when the majority of the barrier film is removed to leave the individual barrier patches.

It can be seen that there are broad similarities between the self-adhesive label and the seal described above. In particular, the releasable portions of the cover film correspond generally to the individual labels cut in the first layer (or face material) of the self-adhesive label stock and the barrier patches correspond generally to the liner portions. The only difference is that in the case of the seal, the majority of the barrier film is peeled away from the cover film to allow the cover film to be adhered to the generally planar top surface of the tray using the exposed adhesive on the underside of the cover film. The releasable portions in the cover film are only removed or released from the remainder of the cover film when the contents of the underlying cavity are to be dispensed.

SUMMARY OF THE INVENTION

The present invention provides a multi-layer product comprising:
  a first layer having pre-formed lines of separation defining one or more first portions;
  an adhesive layer on the first layer; and
  one or more patches on the adhesive layer, each patch being associated with a respective one of the one or more first portions and consisting of a hot melt polymer or other patch material. Suitable patch materials can include polymer or resin compositions, ink compositions such as those suitable for use in a printing process (e.g., inkjet printing, aerosol jet printing and relief printing) and which can include pigment and binder such as a polymer or resin binder and optionally other components such as humectant, co-solvent, surfactant, de-foamer, and the like, or photocurable clear ink compositions, for example.

The first layer can have a first surface (e.g., an upper surface that defines an upper surface of the multi-layer product) and a second surface (e.g., a lower surface to which the adhesive layer is applied).

The first layer can be any suitable material of single or multiple-layer construction, e.g., a paper sheet, a metal foil such as aluminium foil, a metallized polymeric film or paper sheet, a plastics film such as a flexible sheet of polypropylene (PP) or polyethylene terephthalate (PET), of another polyalkylene, or of a polymer blend, or any combination thereof.

The or each line of separation in the first layer can be formed by a pre-scored or pre-perforated tear line, a cut line, or a combination thereof. Lines of separation can be formed using any suitable cutting process, for example using die cutters. The or each line of separation can be a continuous line of separation or can include a gap defining a bridge region that allows the associated first portion to remain physically attached to the remainder of the first layer when it has been released by tearing or separating along the pre-formed line of separation.

Each patch can be aligned with the associated first portion of the first layer and can be of any suitable shape. If the multi-layer product includes a plurality of patches, for example, an array of patches corresponding to an array of first portions of the first layer, the patches will define discrete "mesas" surrounded by the adhesive layer.

The or each patch is preferably non-tacky, particularly after cooling. Each patch is formed on the adhesive layer, after coating or spraying, in-situ, that is, as a result of the coating or spraying process. Each patch is not cut from a stock film or an existing layer of a multi-layer product, but instead is formed independently. Each patch is neither a film nor a sheet. Each patch is unstretched or non-tentered, that is, each patch comprises patch material that has neither been stretched nor tentered. As such, each patch differs from barrier patches made of a pre-formed plastics film or sheet. Unlike barrier patches cut from films that have been tentered or biaxially stretched, the patches of the present invention exhibit good stretchability, flexibility, and tear resistance, in three dimensions, because they comprise a polymeric material that has not been stretched. Moreover, because the patch material is applied as a liquid, the material can be intimately formed on the adhesive layer, can readily conform to surface irregularities in the exposed adhesive layer, and can exhibit better adhesion to the adhesive layer than would be exhibited by a patch cut from a tentered film made of the same chemical material. Immediately after application of a molten liquid patch material, the resulting structure comprises an applied hot melt polymer barrier patch exhibiting an elevated temperature. The temperature can be elevated relative to the remainder of the multi-layer product to which the molten patch material is applied. For example, immediately after application of the molten liquid patch material, the resulting structure comprises an applied hot melt polymer patch exhibiting a temperature of from 100° C. to 220° C., or from 120° C. to 200° C., or from 160° C. to 180° C., depending upon the temperature at which the molten liquid patch material is applied. The patch forming process produces patches without the need for excess patch material or a major portion of a barrier film that needs to be separated from the patches, peeled away from the adhesive layer and discarded. In this regard, the process produces less waste than would be generated by using an entire barrier film or sheet that is applied to the adhesive layer and then peeling away and discarding the majority of the barrier film but for the patches, such as is required by the patch forming process described in U.S. Patent Application Publication No. US 2013/0299499 A1 to Elliot, which is incorporated herein in its entirety by reference. The patch forming process also produces hot melt polymer patches that are fixedly adhered or bonded to the adhesive layer and cannot be peeled away from the adhesive material like a patch that is made from a pre-formed plastics film or sheet, for example. The patches cannot be removed by physical separation if patch material is effectively a molten liquid adhesive that is applied to the exposed surface of an adhesive layer. Patch material therefore cannot come away from the adhesive layer and fall into the underlying tray cavity when a first portion (or releasable portion) is released or removed along the pre-formed line of separation in the first layer, for example. Each patch also exhibits improved water-resistant properties and prevents moisture ingress with a fully sealed perimeter.

Depending on the hot melt polymer or other patch material used, the or each patch can be transparent, translucent or opaque with a suitable color aspect.

The or each patch can be larger than the associated first portion of the first layer. In this case, when a first portion is removed or released from the remainder of the first layer, the respective patch will normally break or rupture—typically along a line that corresponds generally to the pre-formed line of separation of the associated first portion—such that an inner portion of the patch is removed or released along with the first portion and an outer peripheral portion of the patch remains adhered to the adhesive layer. The or each patch can also be the same size as the associated first portion of the first layer, or smaller than the associated first portion of the first layer—i.e., so that each patch is completely contained within the line of separation of the associated first portion.

If the or each patch is larger than the associated first portion of the first layer, each line of separation in the first layer can be a pre-perforated tear line or a cut line that extends completely through the first layer and the adhesive layer, and can extend partly into the underlying patch as long as its structural integrity is not affected. A larger patch will also provide enhanced moisture-barrier properties because any moisture that travels through the pre-perforated tear line or cut line in the first layer must travel outwardly through the adhesive layer to reach the outer peripheral edge of the patch.

The or each patch can be applied to the adhesive layer using any suitable process, for example, a coating or spraying process for hot melt polymers or other suitable patch materials. In one arrangement, one or more coating heads or spray heads can be used to apply hot melt polymer or other suitable patch material to the adhesive layer to form an array of discrete patches of pre-determined size and shape. The coating heads or spray heads are preferably connected by hoses to a source of hot melt polymer or other suitable patch material (e.g., a hot melt polymer/patch material supply unit) and are preferably controlled by a suitable controller, e.g., a pattern controller which can typically operate in different modes and determines the size and shape of the patches applied by the coating heads or spray heads. Hot melt polymer may be provided in the form of a solid feedstock, such as pellets or pastilles for example, and then heated to a suitable temperature (e.g., about 100 to 220° C.) to melt it. The hot melt polymer is applied to the adhesive layer at this elevated application temperature and in its molten liquid form that is sprayable or coatable. The present invention may therefore further provide a multi-layer product or seal where each patch consists of a molten hot melt polymer. The molten hot melt polymer is allowed to cool before a second layer or backing layer is optionally applied to cover the adhesive layer and the one or more patches.

During the coating or spraying process, the adhesive layer (and first layer) may be moved relative to the one or more coating heads or spray heads, e.g., using a transfer roller system. The relative speed of the adhesive layer can be measured and used by the controller to adjust the application of the hot melt polymer or other suitable patch material during the coating or spraying process. Using a coating or spraying process can be cost-effective and avoids the need to define patches from a separate layer of material, e.g., a flexible plastics sheet, the majority of which is then peeled away to expose the adhesive layer. The coating or spraying process may be a printing process such as aerosol jet printing, inkjet printing or relief printing, for example. A suitable patch material, for example an ink composition having the necessary physical properties such as viscosity, temperature, hydrophobicity, and the like, can be applied to the adhesive layer using a coating or spraying process. Herein, unless noted otherwise, by spraying and coating process is meant is a printing process or other application process described herein. In particular, an ink jet printing process can be used.

The coating or spraying process can be carried out before or after the cutting process as required. If the coating or spraying process is carried out after the cutting process, there is no risk of each line of separation extending partly into an underlying larger patch and affecting its structural integrity.

The or each patch can have a thickness in the range of from about 10 μm to about 50 μm, for example, from about 15 μm to about 40 μm or from about 20 μm to about 30 μm.

Any suitable hot melt polymer can be used as the patch material, including a hot melt polymer that might typically be used as a hot melt adhesive. For example, hot melt polymers based on ethylene-vinyl acetate (EVA), polyurethanes or functional polyolefins can be suitable for certain applications. The hot melt polymer or adhesive may comprise a suitable base polymer, a natural or synthetic takifying resin, and a plasticizer.

The hot melt polymer can be a food-grade polymer.

The patch material can be applied as a liquid composition, for example, applied by printing or spraying. The patch material solution or suspension can be used full strength but may be diluted with a solvent to form low concentrations of coating material, for example, polymer. The methods of the present invention can comprise diluting a patch material composition to form a diluted polymer solution or suspension. The dilution can occur prior to applying the solution or suspension to an adhesive layer or to a multi-layered product or multi-layered intermediate product. The patch material solution or suspension can be slightly diluted or greatly diluted, for example, diluted to an extent that results in a concentration of patch material of from 0.01% to 50% by weight patch material based on the total weight of the coating or printing composition. The patch material solution or suspension can contain a concentration of patch material of from 0.01% to 40% by weight patch material, from 0.1% to 30% by weight patch material, from 1.0% to 20% by weight patch material, or from 5.0% to 10% by weight patch material, with the remainder of the patch material solution or suspension being solvent, diluent, or a combination thereof.

Higher weight percentages of patch material can be used although higher concentrations tend to clog small orifices such as nozzles and nozzle openings in ink jet printer print heads. One exemplary patch material composition that can be applied as a diluted liquid is an organic-solvent-based ink jet ink. The patch material composition can be diluted with an appropriate solvent or medium to obtain a coating solids content, or a non-volatile components content, of from about 0.01% by weight to about 50% by weight, preferably from about 0.1% by weight to about 30% by weight, from 1.0% to 20% by weight, or from 5.0% to 10% by weight coating solids content or non-volatile components content, depending upon the application technique and desired patch properties.

Coating methods that can be used include not only spraying or printing, but can additionally or alternatively include 3-D printing, aerosol jet printing, relief printing, screen printing, silk-screen printing, pad printing, brush coating, padding, fogging, transferring, painting, stenciling, laminating, and doctoring.

The patch material composition can comprise a solvent, for example, a volatile solvent. The volatile solvent can contain hydrogen, chlorine, methoxy groups, ethoxy groups, or other halogens. The volatile solvent can comprise, for example, a natural solvent, a synthetic solvent, an aliphatic solvent, an aromatic solvent, a carbonyl solvent, or another organic solvent. The solvent can be an alcohol, acetone, or xylene. Higher boiling solvents can be used but would form coatings requiring more heat to dry than coatings made with the lower boiling solvents. The lower boiling solvents more rapidly evaporate when compared to the higher boiling solvents.

The patch material composition to be applied has a suitable coating solids content or non-volatile components content and viscosity. The coating solids, or non-volatile component, can be a reaction product, can be reactive, or both. The coating solids or non-volatile component, can comprise a polymer, a meltable polymer, a polyalkylene, polyethylene, polypropylene, polybutylene, or the like. The coating solids or non-volatile component can comprise one or more reactants or precursors that can react to form the patch material that results in the patch. For example, the coating solids or non-volatile component can comprise propylene that reacts during or after application to form polypropylene.

If a reactive agent, such as a reactive monomer, polymer, or resin, is included in the patch material formulation, a curing agent for the reactive agent can be added in amounts of from about 1% by weight to about 10% by weight based on the weight of the reactive agent. The curing agent can be a catalyst or another reactant. From about 1% by weight to about 50% by weight solvent for the reactive agent, can be included, based on the weight of the patch material composition to be sprayed, printed, or otherwise applied. Solvents can be added to liquefy the reactive agent, to adjust the viscosity of the reactive agent, or both. Reactive agent solvents can comprise any of the solvents discussed above, or can include triethylphosphate or ethylene glycol. A separate solvent may not be needed according to some embodiments of the invention wherein the reactive agent is liquid at room temperature or wherein a monomer component or surfactant component of the composition acts as a solvent for the reactive agent.

The viscosity of the patch material composition for coating or printing can be tailored to the application method. The viscosity of the composition can be, for example, from 2 mPas to 30 mPas at 25° C., from 3 mPas to 25 mPas at 25° C., from 4 mPas to 20 mPas at 25° C., or from 5 mPas to 15 mPas at 25° C. Exemplary compositions can have a viscosity of 10 mPas or more, of 15 mPas or more, or of 20 mPas or more, at 25° C. At a temperature of 45° C., which corresponds to an exemplary temperature inside an inkjet print head, the composition can have a viscosity of from 2 mPas to 20 mPas, of from 3 mPas to 15 mPas, or of from 5 mPas to 10 mPas, until the composition is ejected through the inkjet head. Compositions having the same viscosities can be used, for example, for the other application methods described herein.

Any suitable adhesive can be used for the adhesive layer.

The multi-layer product can include a second layer and a release layer between the second layer and the adhesive layer and the one or more patches. The second layer can have a first surface (e.g., a lower surface that defines a lower surface of the multi-layer product) and a second surface (e.g., an upper surface to which the release layer is applied). The release layer preferably covers substantially all of the second surface of the second layer. The release layer contacts and covers the adhesive layer and the one or more patches. The second layer acts as a backing layer to cover and protect the adhesive layer that surrounds the one or more patches and to cover and protect the applied patches. The second layer can be peeled away with the release layer to expose the adhesive layer. Any suitable release layer or coating can be used, e.g., a commercially-available silicone-based release layer that can be applied to the second surface of the second layer.

The second layer can be any suitable material of single or multiple-layer construction, e.g., a paper sheet, a metal foil such as aluminium foil, a metallized polymeric film or paper sheet, a plastics film such as a flexible sheet of PP or PET, of another polyalkylene, or of a polymer blend, or any combination thereof. The second layer is preferably a continuous sheet and does not include any pre-formed lines of separation, i.e., cut lines, score lines or perforations.

The multi-layer product can be a self-adhesive label or a seal for use with a container for storing and dispensing consumer products, for example.

The present invention provides a method of making a multi-layer product, comprising the steps of:
 applying an adhesive layer to a surface of a first layer;
 applying a hot melt polymer or other patch material to a surface of the adhesive layer to define one or more patches; and
 cutting at least the first layer to define pre-formed lines of separation defining one or more first portions, each first portion being associated with a respective one of the one or more patches.

The step of cutting the first layer can be carried out before or after the step of applying the hot melt polymer or other suitable patch material to the surface of the adhesive layer. In other words, the lines of separation can be formed using any suitable cutting process, for example using die cutters, before the patches are applied to the adhesive layer or after the patches have been applied to the adhesive layer.

The hot melt polymer or other suitable patch material can be applied to the adhesive layer using any suitable process such as a coating or spraying process as described herein.

Other features of the multi-layer product can be as described herein.

The present invention provides a seal for use with a container for storing and dispensing consumer products comprising a tray having a generally planar top surface into which has been formed one or more discrete cavities for receiving the consumer products, the seal comprising:
 a cover layer to seal the one or more cavities to retain the consumer products in the one or more cavities when secured to the generally planar top surface of the tray, the cover layer having pre-formed lines of separation defining a releasable portion per cavity;
 an adhesive layer on the cover layer; and
 one or more patches on the adhesive layer, each patch being associated with a respective one of the releasable portions and comprising or consisting of a hot melt polymer or other suitable patch material.

The cover layer can have a first surface (e.g., an upper surface that defines an upper surface of the seal) and a second surface (e.g., a lower surface to which the adhesive layer is applied). The part of the cover layer in which the one or more releasable portions are formed can have a footprint and the generally planar top surface of the tray can have the same footprint.

The cover layer can be any suitable material of single or multiple-layer construction, e.g., a paper sheet, a metal foil such as aluminium foil, a metallized polymeric film or paper sheet, a plastics film such as a flexible sheet of PP or PET, of another polyalkylene, or of a polymer blend, or any combination thereof.

The or each line of separation in the cover layer can be formed by a pre-scored or pre-perforated tear line, a cut line, or a combination thereof. Lines of separation can be formed using any suitable cutting process, for example using die cutters. The or each line of separation can be a continuous line of separation or can include a gap defining a bridge region that allows the associated releasable portion to remain physically attached to the remainder of the cover layer when it has been released by tearing or separating along the pre-formed line of separation. Each releasable portion can be larger than the open mouth of the associated discrete cavity that it overlies in use—i.e., so that the pre-formed line of separation is positioned above the generally planar top surface of the tray. Each releasable portion can also be the same size as, or smaller than, the open mouth of the associated discrete cavity that it overlies in use.

Each patch can be aligned with the associated releasable portion of the cover layer and can be of any suitable shape. If the multi-layer product includes a plurality of patches, for example, an array of patches corresponding to any array of releasable portions of the cover layer, the patches will define discrete "mesas" surrounded by the adhesive layer.

The or each patch will preferably be non-tacky and will prevent the consumer products in the discrete cavities from sticking to the adhesive layer when the seal is adhered to the generally planar top surface of the tray.

The or each patch can be larger than the associated releasable portion of the cover layer. In this case, when a releasable portion is removed or released from the remainder of the cover layer, the respective patch will normally break or rupture—typically along a line that corresponds generally to the pre-formed line of separation of the associated releasable portion—such that an inner portion of the patch is removed or released along with the releasable portion and an outer peripheral portion of the patch remains adhered to the adhesive layer. Each patch can also be the same size as the associated releasable portion of the cover layer, or smaller than the associated releasable portion of the cover layer— i.e., so that each patch is completely contained within the line of separation of the associated releasable portion.

If the or each patch is larger than the associated releasable portion of the cover layer, each line of separation in the cover layer can be a pre-perforated tear line or a cut line that extends completely through the cover layer and the adhesive layer, and can extend partly into the underlying patch as long as its structural integrity is not affected. This allows cutting tolerances to be accommodated. A larger patch will provide enhanced moisture-barrier properties because any moisture that travels through the pre-perforated tear line or cut line in the cover layer must travel outwardly through the adhesive layer to reach the outer peripheral edge of the patch. This can help prevent moisture from entering the discrete cavities and damaging the consumer products. A seal where the or each patch is smaller than the associated releasable portion can also provide enhanced moisture-barrier properties if the lines of separation that define each releasable portion are positioned over the generally planar top surface of the tray such that moisture that travels through the pre-perforated tear line or cut line in the cover layer must travel inwardly through the adhesive layer to reach the discrete cavities.

Each patch can be larger than the open mouth of the associated discrete cavity that it overlies in use—i.e., so that the extends above the generally planar top surface of the tray. Each patch can also be the same size as, or smaller than, the open mouth of the associated discrete cavity that it overlies in use.

The or each patch can be applied to the adhesive layer using any suitable process such as a coating or spraying process for hot melt polymers or other suitable patch materials. Further details of the coating or spraying process are explained above.

The or each patch can have a thickness in the range of about 10 to about 50 μm, and more preferably about 15 and about 40 μm.

Any suitable hot melt polymer can be used—see examples described herein.

The seal can include a backing layer and a release layer between the backing layer and the adhesive layer and the one or more patches. The backing layer can have a first surface (e.g., a lower surface that defines a lower surface of the seal before it is peeled away from the cover layer) and a second surface (e.g., an upper surface to which the release layer is applied). The release layer preferably covers substantially all of the second surface of the backing layer. The release layer contacts the adhesive layer and the one or more patches. The backing layer covers and protects the adhesive layer that surrounds the one or more patches and covers and protects the applied patches. The backing layer can be peeled away with the release layer to expose the adhesive layer and allow the cover layer to be adhered to the generally planar top surface of the tray. Any suitable release layer or coating can be used, e.g., a commercially-available silicone-based release layer that can be applied to the second surface of the second layer.

The backing layer can be any suitable material of single or multiple-layer construction, e.g., a paper sheet, a metal foil such as aluminium foil, a metallized polymeric film or paper sheet, a plastics film such as a flexible sheet of PP or PET, of another polyalkylene, or of a polymer blend, or any combination thereof. The backing layer is preferably a continuous sheet and does not include any pre-formed lines of separation, i.e., cut lines, score lines or perforations.

The present invention provides a method of making a seal for use with a container for storing and dispensing consumer products, comprising the steps of:
 applying an adhesive layer to a surface of a cover layer;
 applying a hot melt polymer or other suitable patch material to a surface of the adhesive layer to define one or more patches; and
 cutting at least the cover layer to define pre-formed lines of separation defining one or more releasable portions, each releasable portion being associated with a respective one of the one or more patches.

The method can be used to make a seal for use with a container for storing and dispensing consumer products. The container can have a top surface footprint—e.g., the footprint of a generally planar top surface of a tray into which has been formed one or more discrete cavities for receiving the consumer products. The method can comprise applying an adhesive layer to a surface of a cover layer. The part of the cover layer in which the one or more releasable portions are formed can have a footprint that matches the top surface footprint of the container. The patch material can be applied to a surface of the adhesive layer, using a coating or spraying process, to define one or more patches. The method can comprise cutting at least the cover layer to define pre-formed lines of separation defining one or more releasable portions. Each releasable portion can be associated with a respective one of the one or more patches.

The step of cutting the cover layer can be carried out before or after the step of applying the hot melt polymer or other suitable patch material to the surface of the adhesive layer. In other words, the lines of separation can be formed using any suitable cutting process, for example using die cutters, before the patches are applied to the adhesive layer or after the patches have been applied to the adhesive layer.

The method can also include adhering a backing layer to the adhesive layer to cover the adhesive layer and the one or more patches.

The hot melt polymer or other suitable patch material can be applied to the adhesive layer using any suitable process such as a coating or spraying process as described herein.

Other features of the seal can be as described herein.

The method can use a web of multi-layer precursor material comprising the cover layer, the adhesive layer, and the backing layer with a release layer or coating in contact with adhesive layer. The multi-layer precursor material can be delaminated—i.e., the backing layer and release layer can be peeled away or physically separated from the cover layer and the adhesive layer so that hot melt polymer or other suitable patch material can be applied to the exposed adhesive layer to form the one or more patches. The multi-layer precursor material with the patches applied thereon can then be re-laminated—i.e., where the backing layer and release layer is brought back into contact with the adhesive layer and the one or more patches.

The present invention further provides a multi-layer product-forming system or a seal-forming system comprising one or more coating or spray heads connected to a source of patch material (e.g., hot melt polymer in its melted form), and a controller. The system can include an application station. The application station can comprise one or more coating heads or spraying heads connected to a source of liquid patch material, for example, molten or uncured patch material. The application station can be configured to apply hot melt polymer to the adhesive layer at a temperature of from 100° C. to 220° C. The system can include a conveyor for conveying a multi-layer precursor material into the application station and into an application position. The multi-layer precursor material can be provided as a web and can be of a type described herein, for example, comprising a first layer (or cover layer) and an adhesive layer applied to a surface of the first layer (or cover layer). The adhesive layer can have a first surface and an exposed surface. The first surface can be adhered to the first layer (or cover layer). If the multi-layer precursor material has a second layer (or backing layer) the multi-layer precursor material can be delaminated to expose the adhesive layer when the multi-layer precursor material is in the application position. The second layer (or backing layer) can then be re-adhered to the adhesive layer after the one or more patches have been applied to the exposed surface of the adhesive layer to re-laminate the multi-layer precursor material but with the patches applied thereon. The application position can be a position such that the one or more coating or spray heads face or are directed toward the exposed surface of the adhesive layer. The system can include a controller configured to apply the liquid patch material to the exposed surface of the adhesive layer using the one or more coating heads or spray heads, to form one or more patches of the patch material, on the adhesive layer. The system can further comprise a multi-layer precursor material in the application station, for example, in a position to receive a liquid patch material, or after having received liquid patch material. The system can further comprise a cutting station with a cutter configured to cut the first layer (or cover layer) to define pre-formed lines of separation defining one or more first portions (or releasable portions), each first portion (or releasable portion) being associated with a respective one of the one or more patches.

After being processed, the web of multi-layer precursor material including the patches applied thereon can be cut into a plurality of individual seals. For example, the web can be cut transversely to form a plurality of individual seals.

The present invention further provides a container for storing and dispensing consumer products, comprising:
  a tray having a generally planar top surface into which has been formed one or more discrete cavities for receiving the consumer products; and
  a seal as described herein where the cover layer is secured to the generally planar top surface of the tray by the adhesive layer to seal the one or more cavities to retain the consumer products in the one or more cavities.

The or each releasable portion and its associated patch will overlie a respective discrete cavity of the tray.

The container can be a multiple-compartment container for containing and dispensing medication according to a pre-defined dosage regimen.

BRIEF DESCRIPTION OF THE DRAWINGS

The present invention may be more fully understood with reference to the attached drawings that form a part of the present disclosure. The drawings are intended to exemplify, not limit, the invention.

DETAILED DESCRIPTION OF THE INVENTION

Although the following description relates to a seal for use with a multiple-compartment dispensing container, it will be readily understood that the same features can be applied to other multi-layer products such as self-adhesive labels, for example.

Figure 1:
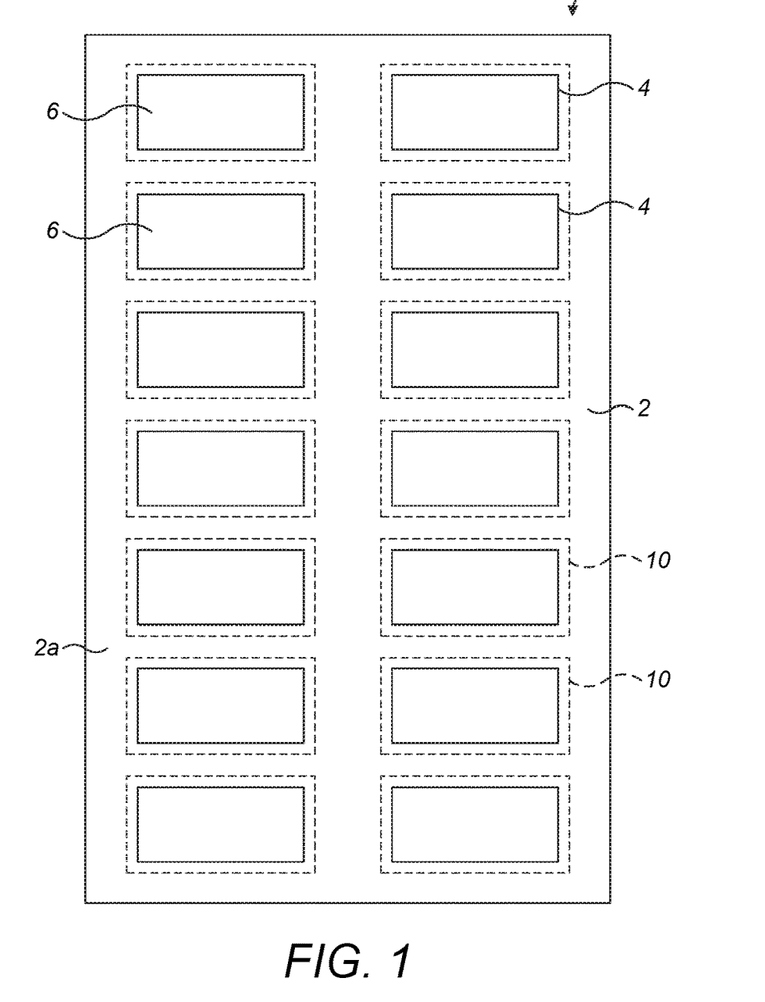
FIG. 1 is a top view of a seal according to the present invention.
Figure 2:
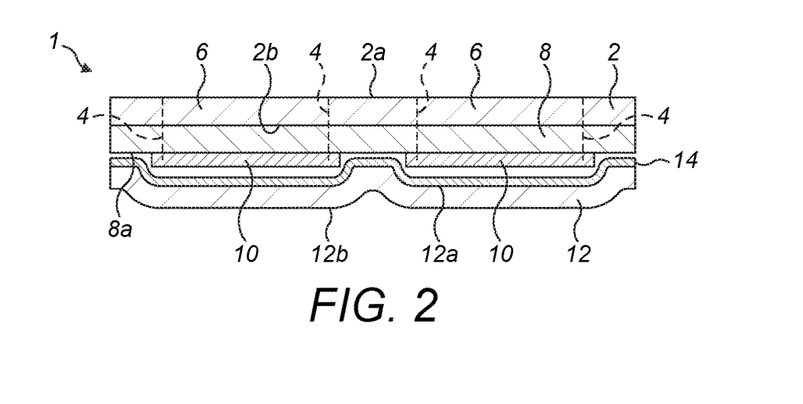
FIG. 2 is a cross section view of the seal of FIG. 1.

A seal 1 is shown in FIGS. 1 and 2 includes a cover layer 2 of single or multiple-layer construction. The cover layer 2 includes pre-formed lines of separation 4 defining a 7×2 array of releasable portions 6. Although shown as a continuous, unbroken line, each line of separation 4 can be a tear line (e.g., a perforation line) that must be torn or broken to release the releasable portion from the remainder of the cover layer 2 or a cut line. A perforation line will include a series of cut lines and ties. Although not shown, each releasable portion can be attached to the remainder of the cover layer by a bridge region defined by a gap in the associated pre-formed line of separation. Each releasable portion will remain attached to the cover layer by means of the bridge region when it separates along the associated line of separation to define a "flap". This can be considered to be more environmentally friendly because the individual releasable portions do not become fully detached from the cover layer and do not need to be discarded each time the contents of a cavity are dispensed.

An upper surface 2a of the cover layer 2 defines an upper surface of the seal 1.

An adhesive layer 8 is applied to a lower surface 2b of the cover layer 2.

A 7×2 array of patches 10 consisting of hot melt polymer or other suitable patch material are applied to a lower surface 8a of the adhesive layer 8. Each patch 10 is aligned with a respective releasable portion 6 as shown. As described in more detail below, the patches 10 are applied to the adhesive layer 8 using a spraying process and are sized and shaped to be larger than the respective releasable portions 6. Each patch 10 is therefore also adhered to an overlapping region of the cover layer between the pre-formed line of separation 4 in the cover layer 2 and the periphery of the patch.

The patches 10 can have a thickness in the range of about 18 to about 37 μm, for example.

The seal 1 further comprises a backing layer 12. A release coating 14 is applied to an upper surface 12a of the backing layer 12. The release coating 14 is adhered to the adhesive layer 8 and contacts the patches 10. A lower surface 12b of the backing layer 12 defines a lower surface of the seal 1.

The pre-formed lines of separation 4 (i.e., the perforation lines or cut lines) extend completely through the cover layer 2 and the adhesive layer 8. They can also extend partly into the patches 10—as shown in FIG. 2—as long as the patches retain their structural integrity and moisture-barrier properties. If the pre-formed lines of separation 4 are cut lines, it will be readily understood that the releasable portions 6 are kept in position by the patches 10 which are larger than the releasable portions.

Figure 3:
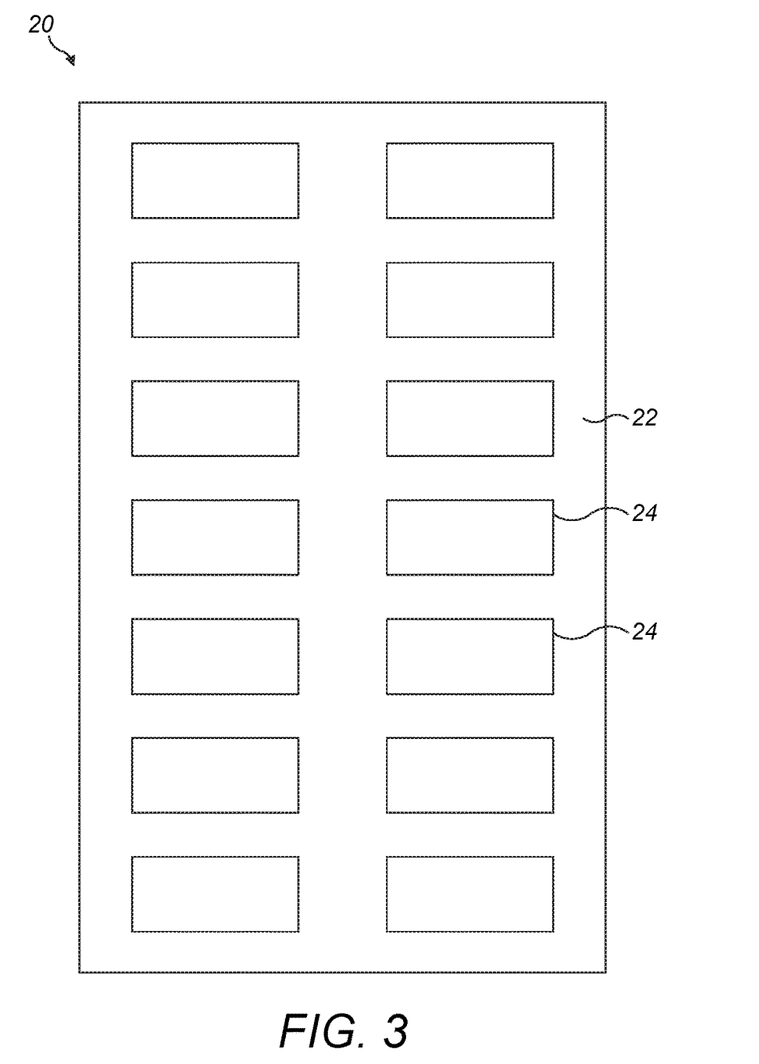
FIG. 3 is a top view of a moulded tray.
Figure 4:
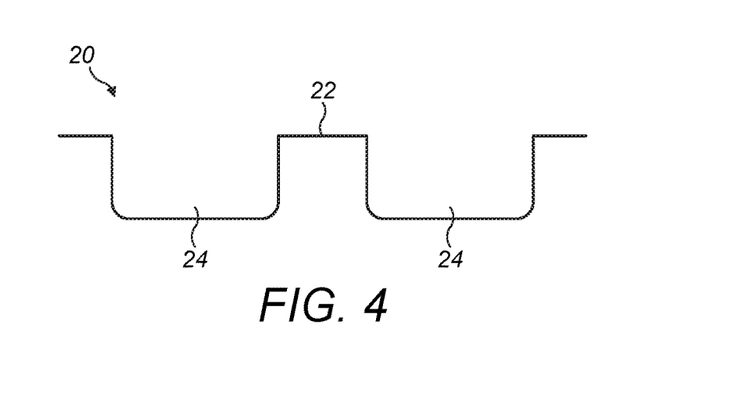
FIG. 4 is a cross section view of the tray of FIG. 3.

FIGS. 3 and 4 show a moulded tray 20 having a generally planar top surface 22 into which has been formed a 7×2 array of discrete cavities 24 for receiving consumer products.

Figure 5:
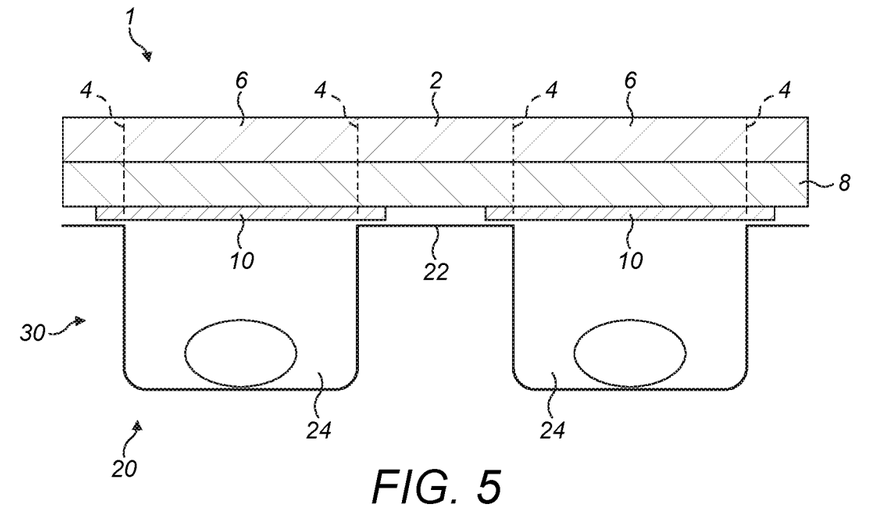
FIG. 5 is a cross section view of a multiple-compartment dispensing container according to the present invention that includes the seal shown in FIGS. 1 and 2 and the moulded tray shown in FIGS. 3 and 4.

A container 30 for storing and dispensing consumer products is shown in FIG. 5. The backing layer 12 and its integral release layer 14 of the seal 1 have been peeled away from the adhesive layer 8 and the cover layer 2 is shown adhered to the generally planar top surface 22 of the tray 20 using the exposed adhesive layer with the open mouths of the discrete cavities 24 being covered by the patches 10 and releasable portions 6. The releasable portions 6 are the same size as the open mouths of the discrete cavities 24. The patches 10 are larger than the open mouths of the discrete cavities 24 and prevent the consumer products in the discrete cavities from coming into contact with, and sticking to, the adhesive layer 8. The patches 10 also provide moisture-barrier (or vapour-barrier) properties by increasing the thickness of the cover layer 2 in the region overlying the open mouths of the discrete cavities 24 and by forcing any moisture that travels through the lines of separation 4 to travel outwardly through the adhesive layer 8 to reach the outer peripheral edge of each patch before it can enter the discrete cavities.

To dispense the contents of a particular cavity, the user simply presses down on the overlying releasable portion 6. If the line of separation 4 is a tear line (e.g., a perforation line) the application of a sufficient amount of force will cause it to tear such that the releasable portion 6 is fully released from the remainder of the cover layer 2 or partially released apart from in the bridge region. If there is a bridge region it will act as a hinge to allow the attached releasable portion (or "flap") to bend downwardly into the cavity or upwardly to allow the contents of the cavity to be dispensed through the opening created in the cover layer 2. The associated patch 10 will break or rupture—typically in a line that corresponds generally to the line of separation 4. This is particularly the case if the line of separation extends partly into the patch as shown in FIG. 2. In some cases, an inner part of the patch 10 may be removed along with the releasable portion 6 and an outer peripheral part of the patch may remain adhered to the underside of the cover layer 2.

Figure 6:
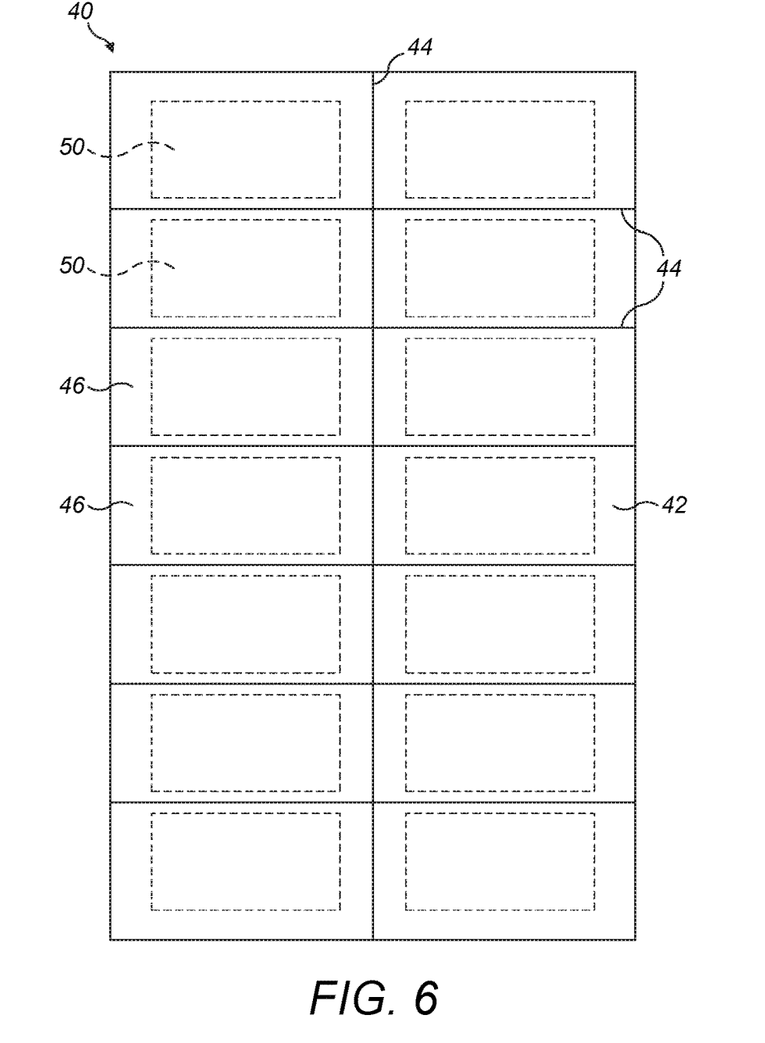
FIG. 6 is a top view of an alternative seal according to the present invention.
Figure 7:
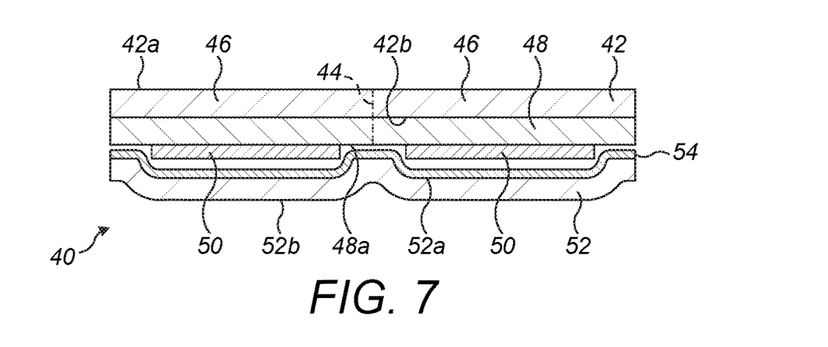
FIG. 7 is a cross section view of the alternative seal of FIG. 6.

An alternative seal 40 is shown in FIGS. 6 and 7 and includes a cover layer 42 of single or multiple-layer construction. The cover layer 42 includes pre-formed lines of separation 44 defining a 7×2 array of releasable portions 46. Although shown as a continuous, unbroken line, each line of separation 44 is a tear line (e.g., a perforation line defined by a series of cuts and ties) that must be torn or broken to release the releasable portion from the remainder of the cover layer 42. In the alternative seal 40, some of the pre-formed lines of separation 44 are shared by adjacent releasable portions as shown.

An upper surface 42a of the cover layer 42 defines an upper surface of the alternative seal 40.

An adhesive layer 48 is applied to a lower surface 42b of the cover layer 42. The lines of separation 44 (e.g., perforation lines) extend completely through the cover layer 42 and the adhesive layer 48 as shown.

A 7×2 array of patches 50 consisting of hot melt polymer or other suitable patch material are applied to a lower surface 48a of the adhesive layer 48. Each patch 50 is aligned with a respective releasable portion 46 as shown. As described in more detail below, the patches 50 are applied to the adhesive layer 48 using a spraying process and are sized and shaped to be smaller than the respective releasable portions 46.

The patches 50 can have a thickness in the range of about 18 to about 37 μm, for example.

The alternative seal 40 further comprises a backing layer 52. A release coating 54 is applied to an upper surface 52a of the backing layer 52. The release coating 54 is adhered to the adhesive layer 48 and contacts the patches 50. A lower surface 52b of the backing layer 52 defines a lower surface of the seal 40.

Figure 8:
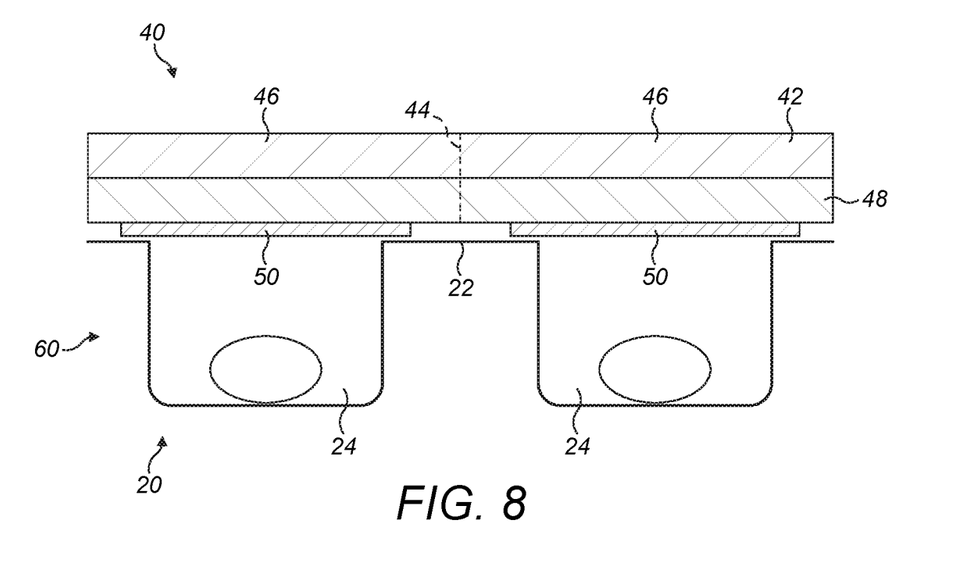
FIG. 8 is a cross section view of an alternative multiple-compartment dispensing container according to the present invention that includes the alternative seal shown in FIGS. 5 and 6 and the moulded tray shown in FIGS. 3 and 4.

A container 60 for storing and dispensing consumer products is shown in FIG. 8. The backing layer 52 and its integral release layer 54 of the alternative seal 40 have been peeled away from the adhesive layer 48 and the cover layer 42 is shown adhered to the generally planar top surface 22 of the tray 20 using the exposed adhesive layer with the open mouths of the discrete cavities 24 being covered by the patches 50 and releasable portions 46. The releasable portions 46 are larger than the open mouths of the discrete cavities 24 and the lines of separation 44 are positioned over the generally planar top surface 22 of the tray 20. Corresponding lines of separation (not shown) may be provided in the generally planar top surface of the tray to allow the discrete cavities to be separated from the remainder of the tray, each discrete cavity retaining its own releasable portion 46. The patches 50 are also larger than the open mouths of the discrete cavities 24 and prevent the consumer products in the discrete cavities 24 from coming into contact with, and sticking to, the adhesive layer 48. The patches can also be the same size as, or smaller than, the open mouths of the discrete cavities. The patches 50 provide moisture-barrier properties by increasing the thickness of the cover layer 42 in the region overlying the open mouths of the discrete cavities 24 and by forcing any moisture that travels through the lines of separation 44 to travel inwardly through the adhesive layer 48 to reach the open mouths of the discrete cavities. In other words, there is no direct path for moisture to travel from the outside environment to the discrete cavities.

Figure 9:
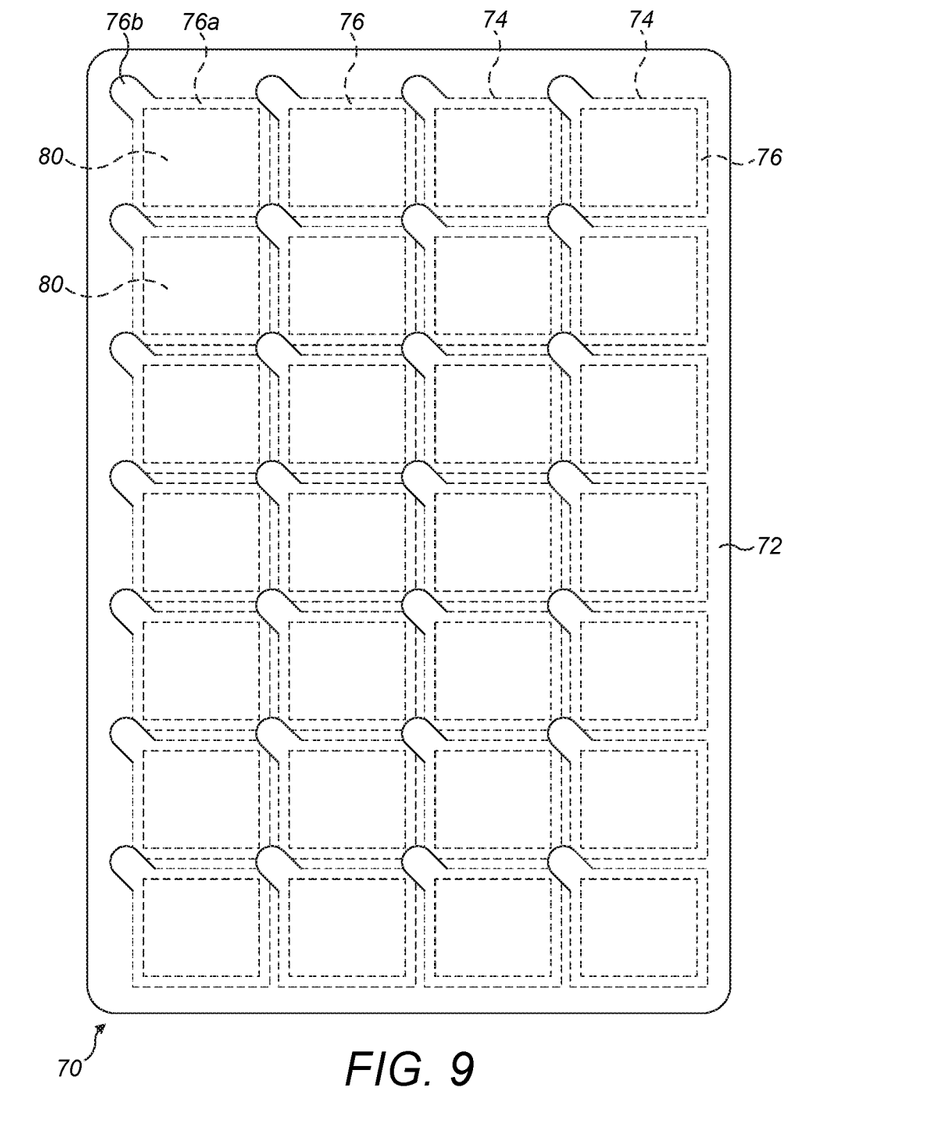
FIG. 9 is a top view of another alternative seal according to the present invention.
Figure 10:
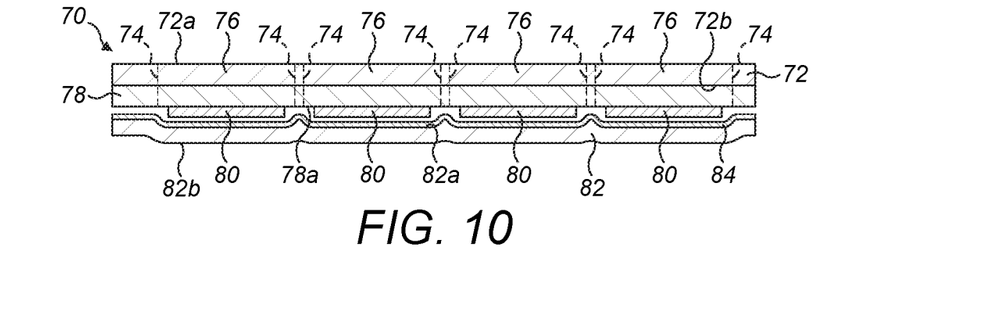
FIG. 10 is a cross section view of the alternative seal of FIG. 9.

Another alternative seal 70 is shown in FIGS. 9 and 10 and includes a cover layer 72 of single or multiple-layer construction. The cover layer 72 includes pre-formed lines of separation 74 defining a 7×4 array of releasable portions 76. Each releasable portion 76 includes a main portion 76*a* and a tab portion 76*b* extending from the main portion that can be grasped preparatory to releasing the releasable portion from the remainder of the cover layer 72. The lines of separation 74 defining the main portions 76 are tear lines (e.g., perforation lines defined by a series of cuts and ties) that must be torn or broken to release the releasable portion and are shown as dashed lines. The tab portions 76*b* are defined by cut lines that are shown as continuous, unbroken lines.

An upper surface 72*a* of the cover layer 72 defines an upper surface of the alternative seal 70.

An adhesive layer 78 is applied to a lower surface 72*b* of the cover layer 72. The lines of separation 74 extend completely through the cover layer 72 and the adhesive layer 78 as shown.

A 7×4 array of patches 80 consisting of hot melt polymer or other suitable patch material are applied to a lower surface 78*a* of the adhesive layer 78. Each patch 80 is aligned with a respective releasable portion 76 as shown. As described in more detail below, the patches 80 are applied to the adhesive layer 78 using a spraying process and are sized and shaped to be smaller than the respective releasable portions 76.

The alternative seal 70 further comprises a backing layer 82. A release coating 84 is applied to an upper surface 82*a* of the backing layer 82. The release coating 84 is adhered to the adhesive layer 78 and contacts the patches 80. A lower surface 82*b* of the backing layer 82 defines a lower surface of the seal 70.

The alternative seal 70 is adhered to the generally planar top surface of a tray with a corresponding 7×4 array of discrete cavities in the same way as the seals described above.

Figure 11:
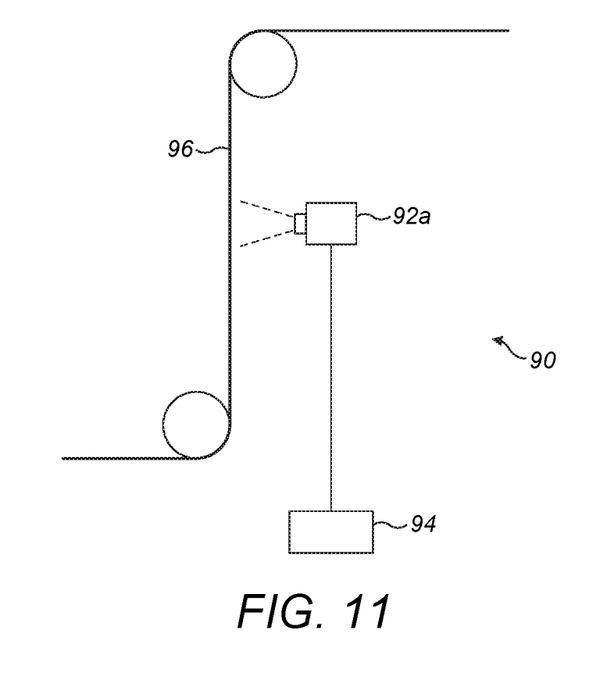
FIG. 11 is a side view of a spraying apparatus.
Figure 12:
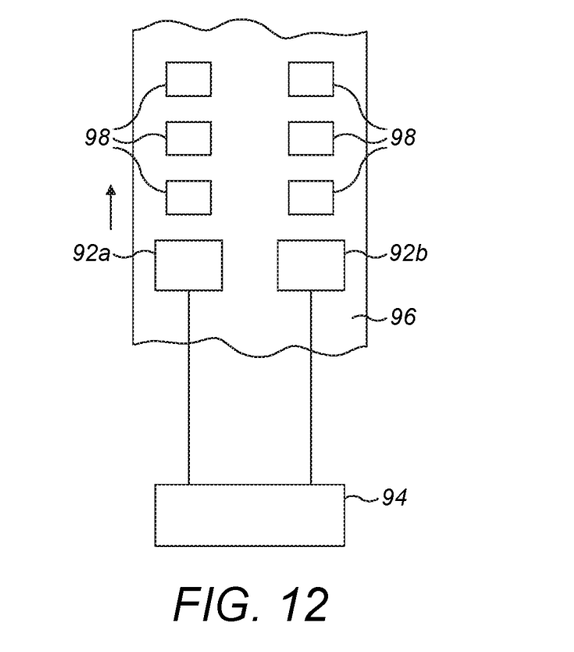
FIG. 12 is a rear view of the spraying apparatus of FIG. 11.

In the case of each of the seals described above, the respective patches are applied to the adhesive layer using a spraying process for hot melt polymers or other patch materials. FIGS. 11 and 12 show a spray apparatus 90 with a pair of stationary spray heads 92*a*, 92*b* arranged side by side. The spray heads 92*a*, 92*b* are connected to a supply 94 of hot melt polymer/patch material. A substrate 96 is moved past the stationary spray heads 92*a*, 92*b* by a transfer roller system. The substrate 96 represents the cover layer and the applied adhesive layer. (The backing layer is adhered to the substrate later.) The substrate 96 may have already undergone a suitable cutting process to pre-form the lines of separation in the cover layer that define an array of releasable portions. The substrate 96 may also undergo a suitable cutting process after the patches have been applied to the adhesive layer. As the substrate 96 moves past the spray heads 92*a*, 92*b*, the spray heads are controlled to spray hot melt polymer or another patch material onto the adhesive layer of the substrate to define two columns of discrete patches 98 as shown in FIG. 12. If the spray apparatus includes more than two spray heads arranged side by side, it will be readily understood that additional columns of discrete patches can be sprayed onto the adhesive layer as the substrate moves past. For example, in the case of the alternative seal 70 shown in FIGS. 9 and 10, the spray apparatus will include four spray heads arranged side by side so that four columns of patches are sprayed onto the adhesive layer of the substrate.

If the patch material is hot melt polymer, any suitable hot melt polymer can be used, for example, a food-grade hot melt adhesive based on ethylene-vinyl acetate (EVA), polyurethanes or functional polyolefins. One suitable hot melt adhesive which uses high-performance polyolefins is KIZEN FORCE 2.0 available from Bostik Ltd, Stafford, United Kingdom, which has an application temperature of 160-180° C., a white aspect, and a Brookfield viscosity of 1220 m.Pa.s at 170° C.

The present invention can include any combination of the various features and embodiments described herein. Any combination of disclosed features herein is considered part of the present invention and no limitation is intended with respect to combinable features.

Applicant specifically incorporates the entire contents of all cited references in this disclosure. Further, when an amount, concentration, or other value of parameter is given as either a range, a preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The invention claimed is:

1. A method of making a multi-layer product, comprising the steps of:
applying an adhesive layer onto an exposed surface of a first layer, to form a multiple-layer construction including an applied adhesive layer having an exposed surface;
applying a patch material onto the exposed surface of the applied adhesive layer, using a coating or spraying process, to define an array of spaced apart patches, the patches being spaced apart from one another on the exposed surface of the applied adhesive layer, the array of patches defining discrete mesas of the patch material, each mesa being independently surrounded by the exposed surface of the applied adhesive layer; and
cutting at least the first layer to define pre-formed lines of separation defining an array of first portions, each first portion of the array of first portions being aligned with a respective one of the spaced apart patches of the array of patches.

2. The method of claim 1, wherein the patch material comprises hot melt polymer.

3. The method of claim 2, wherein the hot melt polymer is a food-grade polymer.

4. The method of claim 2, wherein the hot melt polymer is applied in a molten form such that the hot melt polymer is intimately formed on the exposed surface of the applied adhesive layer and readily conforms to surface irregularities in the exposed surface of the applied adhesive layer.

5. The method of claim 1, wherein the patch material comprises an ink composition and the coating or spraying process comprises a printing process.

6. The method of claim 1, wherein the coating or spraying process uses one or more coating heads or spray heads to apply the patch material to the exposed surface of the applied adhesive layer.

7. The method of claim 6, wherein the applied adhesive layer is moved relative to the one or more coating heads or spray heads during the coating or spraying process.

8. The method of claim 1, further comprising adhering a second layer to the exposed surface of the applied adhesive layer with the array of spaced apart patches thereon, to cover the exposed surface of the applied adhesive layer and the array of spaced apart patches.

9. A method of making a seal for use with a container for storing and dispensing consumer products, the container having a top surface footprint, the method comprising the steps of:
   applying an adhesive layer onto an exposed surface of a cover layer, to form a multiple-layer construction including an applied adhesive layer having an exposed surface, the cover layer having a footprint that matches the top surface footprint of the container;
   applying a patch material onto the exposed surface of the applied adhesive layer, using a coating or spraying process, to define an array of spaced apart patches, the patches being spaced apart from one another on the exposed surface of the applied adhesive layer, the array of patches defining discrete mesas of the patch material, each mesa being independently surrounded by the exposed surface of the applied adhesive layer; and
   cutting at least the cover layer to define pre-formed lines of separation defining an array of releasable portions, each releasable portion of the array of releasable portions being aligned with a respective one of the spaced apart patches of the array of patches.

10. The method of claim 9, wherein the patch material comprises hot melt polymer.

11. The method of claim 10, wherein the hot melt polymer is a food-grade polymer.

12. The method of claim 9, wherein the hot melt polymer is applied in a molten form such that the hot melt polymer is intimately formed on the exposed surface of the applied adhesive layer and readily conforms to surface irregularities in the exposed surface of the applied adhesive layer.

13. The method of claim 9, wherein the patch material comprises an ink composition and the coating or spraying process comprises a printing process.

14. The method of claim 9, wherein the coating or spraying process uses one or more coating heads or spray heads to apply the patch material to the exposed surface of the applied adhesive layer.

15. The method of claim 9, wherein the applied adhesive layer is moved relative to the one or more coating heads or spray heads during the coating or spraying process.

16. The method of claim 9, further comprising adhering a backing layer to the exposed surface of the applied adhesive layer with the array of spaced apart patches thereon, to cover the exposed surface of the applied adhesive layer and the array of spaced apart patches.

* * * * *